Patented Mar. 12, 1940

2,193,653

UNITED STATES PATENT OFFICE 2,193,653

ACCELERATOR OF VULCANIZATION

Waldo L. Semon, Silver Lake, Ohio, assignor to The B. F. Goodrich Company, New York, N. Y., a corporation of New York No Drawing. Application September 15, 1937, Serial No. 163,988

14 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability resulted in a search for less active materials. Derivatives of mono-aryl and alkyl-aryl dithiocarbamic acids have been proposed as accelerators, but they are subject to the same disadvantages and, in some cases, are even more active than the dialkyl compounds.

The process of this invention consists in vulcanizing rubber in the presence of arylalkylidene bis esters of diaryl dithiocarbamic acids. For example, benzal, 1 phenylethylidene, 2 phenylethylidene, beta-naphthylmethylidene, p-tolylmethylidene and similar arylalkylidene bis esters of diphenyl-dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl-p-isopropenylphenyl, p-allylphenyl-beta-naphthyl, phenyl-p-isopropoxyphenyl, phenyl-p-hydroxyphenyl, phenyl-p-phenyloxyphenyl, di-o-anisyl, phenyl-p-chlorphenyl, phenyl-m-bromphenyl, phenyl - p - dimethylaminophenyl, phenyl - p - methylaminophenyl, phenyl - p - anilinophenyl, phenyl-p-nitrophenyl, phenyl - p - acetylamidophenyl, or other like diaryl dithiocarbamic acids are all excellent accelerators of vulcanization. The term aryl is therefore to be understood as designating both unsubstituted and substituted monovalent radicals containing an aromatic carbocyclic ring with the free valence on a nuclear carbon atom unless it is specifically limited to hydrocarbon aryl groups. The diarylarylene bis dithiocarbamic acids such as diphenylphenylene bis dithiocarbamic acid are also included in the generic term diaryl dithiocarbamic acid. The properties of these diaryl-dithiocarbamic esters differ markedly from those of the corresponding aliphatic acids, especially in respect to the speed with which they effect vulcanization. While the aliphatic dithiocarbamic esters produce rapid, uncontrollable vulcanization, the accelerators of this invention, as will be hereafter shown, produce a slow, easily-controlled vulcanization which permits careful regulation of the properties of the finished products.

The accelerators of this invention are easily prepared by a number of methods. A convenient method consisting in reacting the aralkylidene di-halide with a metallic salt of a diaryl-dithiocarbamic acid. Benzal bis diphenyl-dithiocarbamate, for instance, may be prepared by reacting benzal chloride with sodium diphenyl-dithiocarbamate in a molal ratio of about 1:2.

As a specific example of one embodiment of the method of this invention, a rubber composition was prepared by mixing rubber 100 parts by weight, zinc oxide 5 parts, stearic acid 1 part, sulfur 3.5 parts, and benzal bis phenyl-beta-naphthyl dithiocarbamate 0.5 part. This composition did not cure at all when it was heated in a press for 30 minutes at 240° F., but a well-cured composition was obtained by curing for 120 minutes at this same temperature. Corresponding cures were obtained in 45 minutes at 260° F. and 30 minutes at 287° F. Similar even, easily-controllable cures may be obtained with benzal bis diphenyl dithiocarbamate, benzal bis phenyl-alpha-naphthyl-dithiocarbamate, and indeed any of the accelerators herein described.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving or suspending therein; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in molds, in hot air, steam, hot water, etc. The accelerators of this invention may advantageously be used in as low a proportion as 0.1% of the rubber in the composition, in which case 3 or 4% of sulfur is generally required or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of an aralkylidene bis diaryl dithiocarbamate.
2. The process which comprises vulcanizing rubber in the presence of an aralkylidene bis di(hydrocarbon-aryl) dithiocarbamate.
3. The process which comprises vulcanizing rubber in the presence of a benzal bis di(hydrocarbon-aryl) dithiocarbamate.
4. The process which comprises vulcanizing rubber in the presence of a benzal bis phenylaryl dithiocarbamate.
5. The process which comprises vulcanizing rubber in the presence of benzal bis diphenyl dithiocarbamate.
6. The process which comprises vulcanizing rubber in the presence of benzal bis phenyl-alpha-naphthyl dithiocarbamate.
7. The process which comprises vulcanizing rubber in the presence of benzal bis phenyl-beta-naphthyl dithiocarbamate.
8. The process which comprises heating a mixture of rubber, sulfur, and an aralkylidene bis diaryl dithiocarbamate.
9. An unvulcanized rubber composition containing rubber, a vulcanizing agent, and an aralkylidene bis diaryl dithiocarbamate.
10. An unvulcanized rubber composition containing rubber, a vulcanizing agent, and an aralkylidene bis di(hydrocarbon-aryl) dithiocarbamate.
11. An unvulcanized rubber composition containing rubber, a vulcanizing agent, and a phenyl alkylidene bis di(hydrocarbon-aryl) dithiocarbamate.
12. An unvulcanized rubber composition containing rubber, a vulcanizing agent, and benzal bis diphenyl dithiocarbamate.
13. An unvulcanized rubber composition containing rubber, a vulcanizing agent, and benzal bis phenyl-alpha-naphthyl dithiocarbamate.
14. An unvulcanized rubber composition containing rubber, a vulcanizing agent, and benzal bis phenyl-beta-naphthyl dithiocarbamate.

WALDO L. SEMON.